United States Patent [19]

Pereda

[11] Patent Number: 4,779,570
[45] Date of Patent: Oct. 25, 1988

[54] DRAGGING ARRANGEMENT FOR REGULATING THE ADVANCE OF WIRES DEFINING A PASTURE FRONT IN FRONTAL PASTURE SYSTEM

[76] Inventor: Fernando R. Pereda, H. Yrigoyen 1534, Buenos Aires, Argentina

[21] Appl. No.: 901,752

[22] Filed: Aug. 28, 1986

[30] Foreign Application Priority Data

Sep. 3, 1985 [AR] Argentina ................... 301.487

[51] Int. Cl.[4] .......................................... A01K 1/02
[52] U.S. Cl. ..................................... 119/20; 119/155; 256/10
[58] Field of Search ............... 119/20, 51 R, 155; 256/10; 239/736, 744, 750

[56] References Cited

U.S. PATENT DOCUMENTS

| 2,690,898 | 10/1952 | Melcher | 256/10 X |
| 3,972,307 | 8/1976 | Marseillán | 119/20 |
| 4,078,771 | 3/1978 | Diggs | 256/10 |
| 4,445,460 | 5/1984 | Stencil | 119/20 |

FOREIGN PATENT DOCUMENTS 1016977 10/1957 Fed. Rep. of Germany ........ 119/20

Primary Examiner—Robert P. Swiatek
Assistant Examiner—R. Thomas Price
Attorney, Agent, or Firm—Ladas & Parry

[57] ABSTRACT

A frontal pasture system utilizes a mobile wire fence provided with a lower insulated wire and an upper electrified wire. The animals contained by the system can push on the lower wire to displace the fence. The upper wire is electrified to contain the animals within the boundary of the pasture front. The system utilizes a frame having a sliding base and a regulating mechanism for preventing differential displacements of the fence with respect to the guide wires. The regulating mechanism comprises an arm mounted on the base and having a freely rotating wheel contacting the earth. A locking device acts on a stop causing teeth on the wheel to dig into the ground. The arm pivots about the point at which it is joined to the frame raising the rear portion of the frame from the ground. In an alternate embodiment the locking device comprises two arms joined in a scissor-like fashion.

18 Claims, 3 Drawing Sheets

DRAGGING ARRANGEMENT FOR REGULATING THE ADVANCE OF WIRES DEFINING A PASTURE FRONT IN FRONTAL PASTURE SYSTEM

FIELD OF THE INVENTION

The instant invention relates to a dragging arrangement for regulating the advance of wires defining a pasture front in frontal pasture systems.

BACKGROUND OF THE INVENTION—PRIOR ART

Frontal pasture systems comprising a mobile wire fence provided with two wires, the lower of which is insulated and may be pushed by the animals' forehead for displacement thereof, and the upper wire of which is electrified to prevent cattle from going beyond the boundary of the pasture front, are already known in the art.

Said mobile wire fence is located so that its ends runs or displaces on two parallel longitudinal wires located on the edges of the pasture, acting as guides.

Different means are also known for supportting said mobile fence and facilitating its movement when it is pushed by animals seeking food.

Conveying mechanisms are also known for wires defining said pasture front and which, supported by a guide wire, are displaced along said wire by the action of animals on the insulated wire defining the front and permitting the advance of the animals and in turn the advance of the pasture front.

One of these conveying mechanisms is disclosed and claimed in Argentine Pat. No. 226,264 in the name of the same applicant.

All known frontal pasture systems present disadvantages regarding displacement being hindered due to the advance or slowness of one of their ends with respect to the other on the guide wires. This differentiated displacement causes the means supporting the mobile wire fence work forming an angle with respect to he forward direction, thus generating cross force components towards the delayed side braking the displacement of the pasture front.

SUMMARY OF THE INVENTION

It is an object of the instant invention to provide a mechanism solving said disadvantages and providing a uniform advance of the whole pasture front, even in cases in which the animals are only near one of its ends.

Therefore, the object of the instant invention is an arrangement for regulating the advance of wires defining a pasture front in frontal pasture systems, comprising a lower insulated wire and an upper electrified wire, support means for said wires and conveying means located on both ends of said wires and mounted on guide wires, said arrangement for regulating the wire advance being characterized by comprising a regulating mechanism including: a frame provided with sliding means and support means for a device regulating the advance including, in turn, a base, mounted on said support means, an arm mounted on said base and carrying on one of its ends a free rotating wheel, and locking means for said wheel; said insulated wire being connected to said frame, and said electrified wire being electrically connected to said frame, said electrified wire being provided with at least a means braking its axial sliding movement.

The invention will be further understood on the basis of the attached drawings, in which a preferred, non-limitative embodiment thereof is shown.

BRIEF DESCRIPTION OF THE DRAWINGS

In all figures, corresponding elements are indicated with the same reference numerals, and in FIG. 1 the frame of the mechanism of the arrangement object of the invention is designed with reference 1.

DETAILED DESCRIPTION OF THE INVENTION

Figure 1:
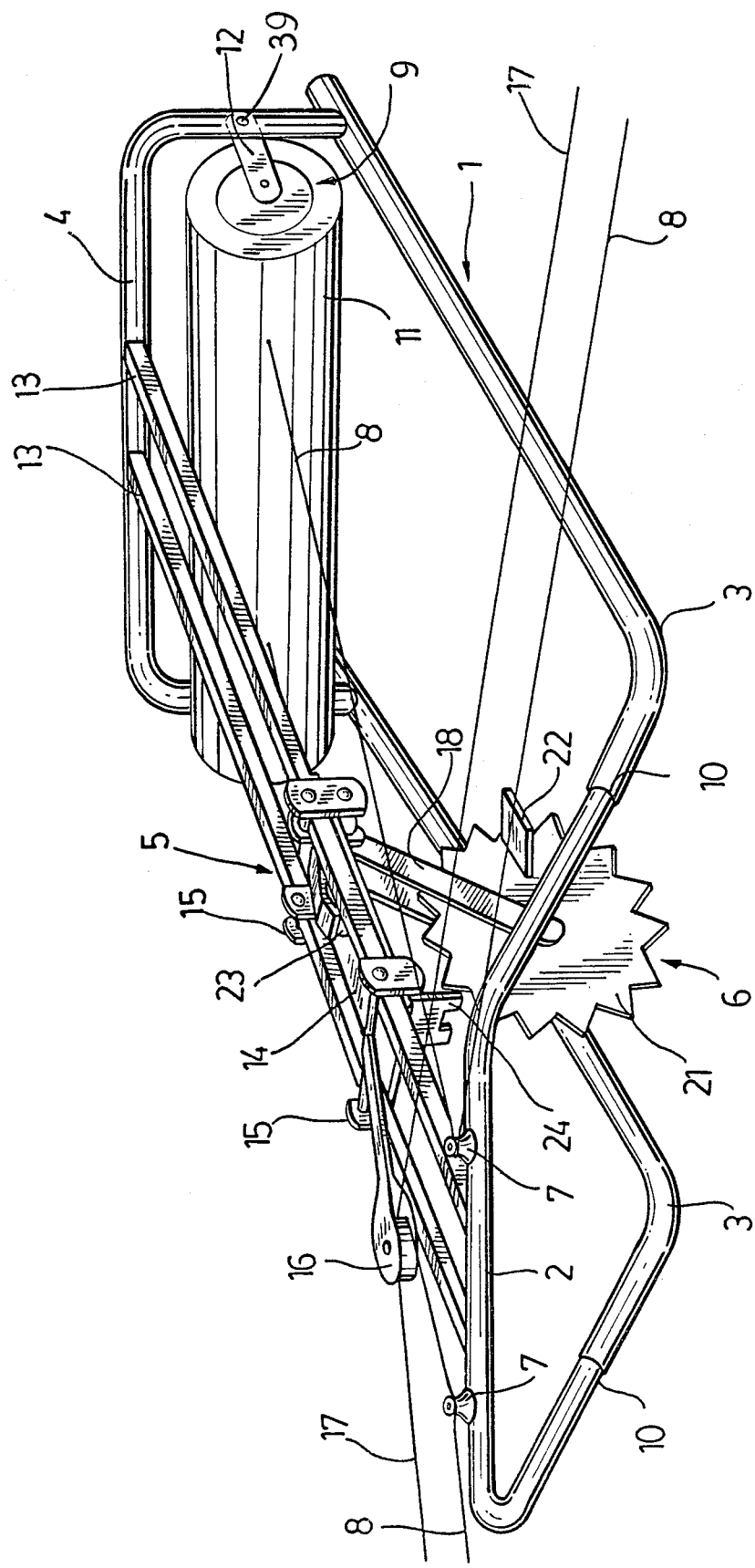
FIG. 1 is a perspective view of the regulating mechanism of the invention.

The frame 1 is sled-shaped and is formed by a leading portion 2, sliding shoes 3, a rear portion 4 and a support device 5 for an advance regulating means 6.

Said leading portion 2 has insulated means 7 for changing the direction of an insulated wire 8, and the rear portion 4 has winding means 9 for the ends of said insulated wire 8. Said winding means is in contact with the ground and, when the frame advances, they tend to rotate and wind up the insulated wire 8. When the pressure exerted by the cattle exceeds the friction of the winding means against the ground, the winding means may slide, thus permitting unwinding of the insulated wire 8. Although the winding means comprises a single drum mounted on the arms 12 shown in FIG. 1, two drums mounted on a single axle may also be used.

Shoes 3 are coated by an insulating element 10 in order to avoid the grounding of the electrified wire fence.

FIG. 1 shows that said insulating means 7 for changing the direction of insulated wire 8 are two insulators connected by bolts to said frame 1, and that winding means 9 consists of a roller 11 supported by arms 12 pivotably connected at 39 to the rear portion 4 of frame 1.

The support means 5 comprises two parallel guides 13 on which an advance regulating device 6 is mounted. Said guides 13 are parallel to the forward direction of the shoes 3 and are joined at their ends to the leading portion 2 and the rear portion 4 of frame 1.

Said advance regulating means 6 is formed by a base 14, mounted on said parallel guides 13 by coupling means 15. The forward coupling means 15 are pivotably connected to a passage means 16 for an electrified wire 17, said passage means 16 being a pulley in the disclosed embodiment.

Figure 2:
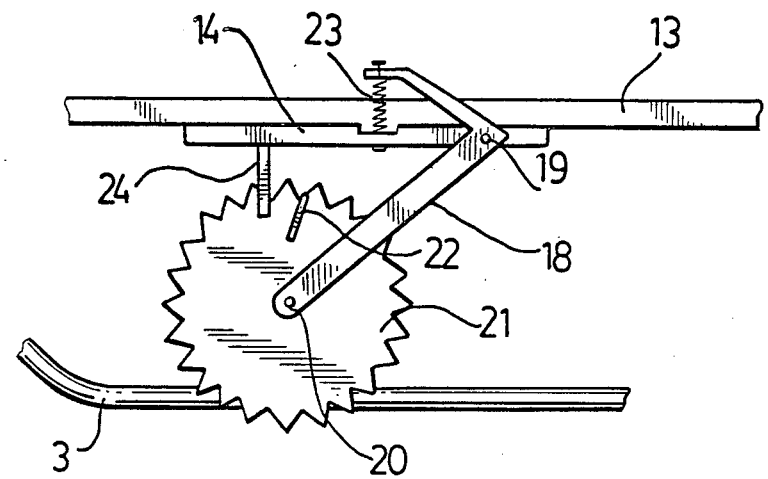
FIG. 2 is a side schematic view of an element constituting the instant invention.

At the rear portion of said base 14, there is an L-shaped arm 18 pivotally mounted thereon, rotating about a point 19 (FIG. 2). In the preferred embodiment shown, the longer arm of said L shaped arm 18 is a fork at the end of which the shaft 20 of a wheel 21 is mounted. Said wheel 21, in this case a sprocket wheel, is mounted for free rotation and has a locking means 22, and is electrically insulated from said frame 1.

The short arm end of said L shaped arm 18 is connected to said base 14 by means of a biasing means 23, comprising a spring, as shown in the figures. Base 14 has a stop means 24 acting on the locking means 22 of the sprocket wheel 21.

Said sprocket wheel 21, in its working position, and freely rotating, is disposed so that its teeth project below the horizontal plane formed by the sliding shoes 3, so that when the regulating mechanism of the invention advances, said teeth are inserted into the ground and said sprocket wheel 21 rotates without sliding motion thereof.

The regulating mechanism of the invention is provided at the center of the mobile wire fence, so that its forward or advance direction coincides with that of the support means of said mobile wire fence at both sides thereof.

Figure 3:
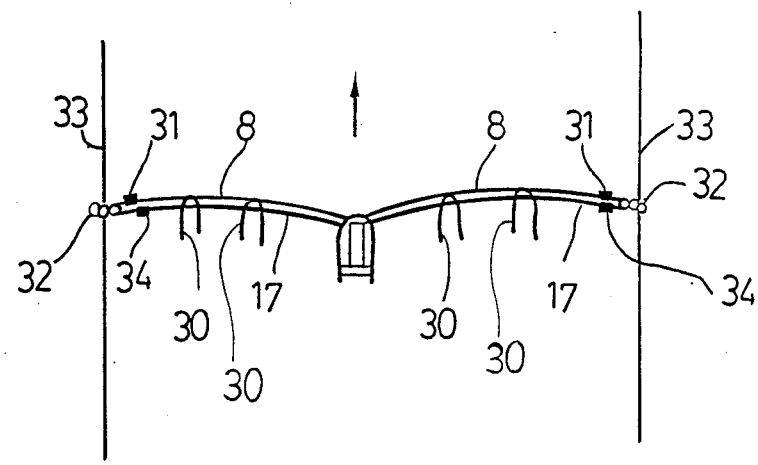
FIG. 3 is a scheme of the arrangement object of the invention, in a frontal pasture system.

The path of the wire is as follows, as schematically shown in FIG. 3: one end of the insulated wire 8 is connected to said winding means 9, passing around one of said insulating means 7, and through support means 30 of the wire fence and fixed thereto, ending at an insulator 31 located near a conveying mechanism 32 comprising a plurality of pulleys on either side of a guide wire 33, the pulleys sliding along the guide wire as described more fully below.

Said insulator 31 is connected to the end of the electrified wire 17 which, passes through said conveying mechanism 32, said support means 30 of the mobile wire fence, said passage means 16, said support means 30 provided at the other side of the regulating mechanism of the invention and said conveying mechanism 32 mounted at the other guide wire 33, ends at an insulator 31. It is to be noted that said electrified wire 17 is provided with stops 34 close to the conveying mechanisms 32.

Insulator 31 is connected to the end of the insulated wire 8. The wire passes through support means 30 and then around insulating means 7; its other end being fixed to winding means 9 comprising the roller 11.

The regulating mechanism of the invention, once it is mounted on the mobile wire fence of the pasture front, produce movement impulses on the upper electrified wire 17 advancing the conveying mechanisms 32, mounted on guide wires 33, 33'. These impulses favor the advance of the conveying mechanism 32 which is delayed, so that the pasture front always displaces substantially perpendicular to the guide wires 33. In this way, sticking and breakage of the frontal pasture system are avoided.

Said impulses are produced by the action of the sprocket wheel 21. When cattle push on wire 8, the ends of the wire slide over the guide wires 33 advancing the pasture front. This sprocket wheel 21 rotates until locking means 22 contact stop means 24, causing the wheel to stop rotating and causing the teeth to become inserted into the ground. This causes frame 1 to remain fixed at one location on the ground. As the cattle keep pushing wire 8, roller 11 slides on the ground and slowly unrolls the ends of the wire 8. If all of the wire 8 has been unrolled and the cattle keep pushing on wire 8, the tail end of frame 1 is raised off of the ground causing the long arm of the L-shaped arm to pivot on its joint 19 and overcome the force of spring 23. The arms 18 are separated by sufficient width to permit the passage of the locking means 22. The raising of frame 1 causes stop means 24 to be raised above locking means 22 thus permitting rotation of the sprocket wheel 21 and allowing the frame 1 to advance. The advancing frame allows the roller 11 to begin contacting the ground, whereupon the rolling motion of roller 11 rerolls part of wire 8. The process will start again as the pasture front is advanced. This "frog jump" operation of the regulating mechanism of the present invention generates the impulses along electrified wire 17 which allows the pasture front to advance along guide wires 33.

On the other hand, when one of the conveying mechanisms 32, is delayed, the stop 34, which is at the leading side, contacts the conveying mechanism 32, braking its advance, and allowing the delayed conveying mechanism 32 to advance until uniformity is obtained.

Figure 4:
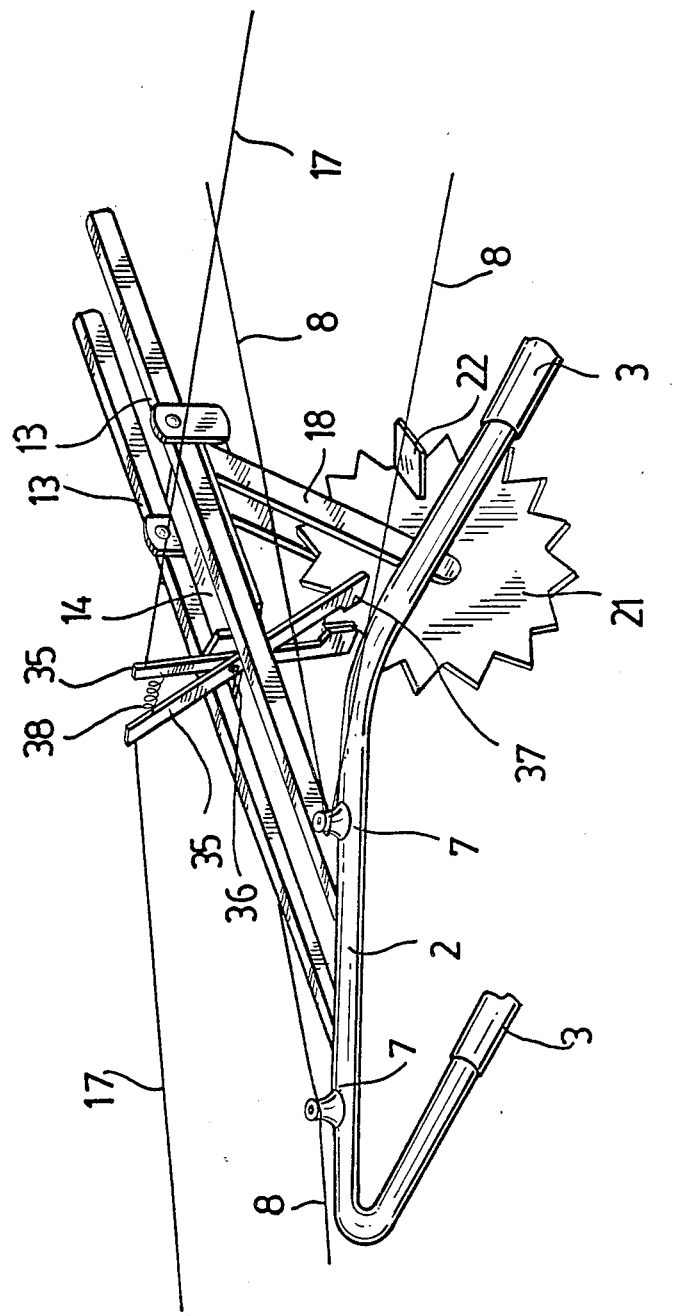
FIG. 4 shows a second embodiment of said locking means for said wheel.

FIG. 4 is a scheme of another preferred embodiment of the wheel locking means. In this case, arm 18 is solidly mounted to the base 14 and the wheel 21 has stop means 22 at both sides thereof.

Said locking means comprise two arms 35 jointed in the form of scissors in an intermediate point thereof, by means of an axle 36 solidly mounted to the base 14. Said arms 35 are joined in the upper ends to said electrified wires 17 and have at their upper ends locking means 37 of the wheel 21 when they contact stop means 22.

Said arms 35 are biased towards their closing position by means of biasing means 38, which according to their location, may operate under compression or under traction.

The operation of this second embodiment of the invention is equivalent to that of the first embodiment, since the scissors formed by arms 35 is closed and locks wheel 21 until traction exerted by electrified wires 17 be sufficiently high so as to overcome the force of the biasing means 38 which, upon being overcome, allows the opening of the scissors and releases wheel 21, thus resulting in the advance of the regulating arrangement of the invention and, therefore, in the advance of the pasture front.

It is to be noted that said wheel is electrically insulated, as well as said locking means 37, in order to prevent grounding of the voltage in said wire.

I claim:

1. In a frontal pasture system of the type comprising a lower insulated wire and an upper electrified wire, means for supporting said wires, and conveying means located at both ends of said wires and mounted on guide wires, an arrangement for regulating the advance of wires defining a pasture front comprising: a frame provided with sliding means and support means, a base mounted on said support means, an arm mounted on said base carrying a freely rotating wheel on one of its ends, a locking means for said wheel; said insulated wire being fixed to said frame and said electrified wire being connected to said frame, said electrified wire being providing with at least one means for braking its sliding movement.

2. Arrangement as claimed in claim 1, wherein said sliding means are sled-shaped.

3. Arrangement as claimed in claim 1, wherein said sliding means are insulated.

4. Arrangement as claimed in claim 1, wherein said support means are two parallel guides.

5. Arrangement as claimed in claim 1, wherein said arm is pivotally mounted on said base and is L-shaped.

6. Arrangement as claimed in claim 5, wherein said pivotally mounted arm is connected to said base by means of a biasing means.

7. Arrangement as claimed in claim 6, wherein said biasing means is a spring located between said base and an end of said L-shaped arm.

8. Arrangement as claimed in claim 1, wherein said arm is pivotally mounted on said base and is fork-shaped.

9. Arrangement as claimed in claim 1, wherein said wheel locking means comprise a locking means located on said base and a stop means located at said wheel whereby said locking means is positioned so that it acts against said stop means.

10. Arrangement as claimed in claim 1, wherein said wheel locking means comprises at least one stop means on said wheel and two arms mutually joined, as scissors, on an axle solidly mounted to said base, having their upper ends joined to said electrified wires and their lower ends provided with locking means.

11. Arrangement as claimed in claim 10, wherein said arms are provided with biasing means.

12. Arrangement as claimed in claim 11, wherein said biasing means are springs.

13. Arrangement as claimed in claim 1, wherein said wheel projects from a plane determined by said sliding means.

14. Arrangement as claimed in claim 1, wherein said insulated wire is secured to winding means located on said frame.

15. Arrangement as claimed in claim 1, wherein said electrified wire is slidably connected to said frame.

16. Arrangement as claimed in claim 15, wherein said electrified wire is connected to said frame by means of a pulley.

17. Arrangement as claimed in claim 1, wherein said wheel is a sprocket wheel.

18. Arrangement as claimed in claim 1, wherein said braking means are stops located close to the conveying means.

* * * * *